United States Patent
Yu

(10) Patent No.: US 6,859,645 B2
(45) Date of Patent: Feb. 22, 2005

(54) SQUELCH DETECTION CIRCUIT

(75) Inventor: Jae-Suk Yu, Seoul (KR)

(73) Assignee: Samsung Electronics Co., Ltd. (KR)

(*) Notice: Subject to any disclaimer, the term of this patent is extended or adjusted under 35 U.S.C. 154(b) by 700 days.

(21) Appl. No.: 09/957,985

(22) Filed: Sep. 21, 2001

(65) Prior Publication Data

US 2002/0142743 A1 Oct. 3, 2002

(30) Foreign Application Priority Data

Mar. 30, 2001 (KR) .......................................... 2001-16832

(51) Int. Cl.$^7$ ................................................. H04B 1/10
(52) U.S. Cl. ......................... 455/222; 455/218; 375/351; 327/551
(58) Field of Search ................................. 455/222, 218, 455/550, 557, 556; 327/551; 330/258, 69

(56) References Cited

U.S. PATENT DOCUMENTS

| | | | | |
|---|---|---|---|---|
| 4,724,545 A | * | 2/1988 | Hamada | ..................... 455/218 |
| 5,003,556 A | * | 3/1991 | Curtis et al. | ................ 375/351 |
| 2003/0112058 A1 | * | 6/2003 | Park | .......................... 327/551 |

* cited by examiner

*Primary Examiner*—Melur Ramakrishnaiah
(74) *Attorney, Agent, or Firm*—Mills & Onello, LLP

(57) ABSTRACT

Disclosed is a transmission envelope detector referred to a squelch detection circuit for effectively detecting an element of transmission data in a high speed serial data transmission system. The squelch detection circuit of the invention includes a differential input level shifter, a first reference voltage generator, an amplifier, a second reference voltage generator, and a comparator. The squelch detection circuit can detect whether the transmission data is a noise or signal element even at a cross point of the transmission data, resulting in achieving stable data transmission.

8 Claims, 4 Drawing Sheets

SQUELCH DETECTION CIRCUIT

This application relies for priority upon Korean Patent Application No. 2001-16832, filed on Mar. 30, 2001, the contents of which are herein incorporated by reference in their entirety.

FIELD OF THE INVENTION

The present invention generally relates to a circuit for providing an interface between a bus and one or more devices connected thereto in digital data processing systems, and more particularly to a squelch detection circuit detecting data components in interfacing general-purpose serial buses such as wire cables connecting computers to peripheral equipment with devices connected to the buses.

BACKGROUND OF THE INVENTION

In spite of making great strides in computers, in particular in personal computers from the middle of the 1990s, there have been limited changes in their peripheral equipment. However, the peripheral equipment of personal computers or workstations is noticeably changing. Some such changes are due to new general-purpose buses, for example, USB (universal serial bus), FW (fire wire, or IEEE1394), FC (fiber channel), SSA (serial storage architecture), and so on. The USB is expected to be the next generation computer peripheral equipment interface, with the FW (or, IEEE1394) being appropriate for multi media use.

Unlike the conventional parallel buses, the USB has the following characteristics. It does not need to be set up by a terminator or jumper in the circumstance of PnP (plug-and-play). Also, auto assignment of ID and a hot plug, i.e., a device is detachable when the computer is in a power-on state, are possible. Moreover, the USB cable has only four lines, i.e., two signal lines D+(GREEN), and D−(WHITE), power supply line $V_{BUS}$ (RED), and ground line GND (BLACK). Thus, it is possible to fabricate short cables and small connectors, resulting in decreasing production cost as well as developing inexpensive peripheral equipment.

According to the "USB Specification Revision 2.0" (Apr. 27, 2000), the USB cable connects USB devices to a USB host. There is only one host in any USB system. The USB system has a tiered star topology. The USB devices are hubs providing additional connections for the USB system and functions providing capabilities for the USB host such as ISDN (integrated service digital network) connection, digital microphone, keyboard, digital joystick, speaker, etc. The host is a host computer system where a host controller is installed for achieving the USB interfacing operation of the host, and necessarily has a root hub being directly connected to the host controller. A plurality of nodes, i.e., other hubs or function devices are connected to one hub. Data being transferred between functions passes through the host.

According to the USB Specification Revision 2.0 (Apr. 27, 2000), the USB operation in a high speed mode supports data transmission of 480 Mb/s. Further, a low speed mode and full speed mode support the data transmissions of 1.25 Mb/s and 12 Mb/s, respectively.

A transmission envelope detector is referred to as "squelch" operates in the high speed mode. Generally, the squelch detection circuit serves to detect low differential input voltage level and detects whether the data being transmitted on the bus is a noise element or a valid signal element.

According to the USB Specification Revision 2.0 (Apr. 27, 2000), the differential voltage formed between the signal lines D+(GREEN) and D−(WHITE) is used for three purposes. First, when differential receiver on a receiving end of the cable receives a differential data signal, the differential receiver utilizes a squelch detector to detect whether the signal of the connector is invalid. Secondly, a differential envelope detector on the receiving end of the cable measures when the link is in a squelch state. Thirdly, in a case of a downstream transceiver, the differential envelope detector monitors whether the signal of the connector on the connector is in a high speed state.

In accordance with the USB Specification Revision 2.0 (Apr. 27, 2000), the transmission envelope detector serves to represent that the data is invalid when a voltage level of the differential signal on the input ends of the receiver is lower than a high speed squelch level, referred to as a "squelch threshold". It is desirable that the transmission envelope detector represent the squelch when the differential signal voltage level is less than 100 mV and represent that the line is not in the squelch state when the differential signal voltage level is more than 150 mV.

In general, the conventional squelch detection circuit detecting the cases that voltage level of the differential input signal is less than 100 mV or more than 150 mV includes a comparator. The comparator provides a low level output when the signal is less than 100 mV, and a high level output when the signal is more than 150 mV. However, the conventional squelch detection circuit is subject to be in a high-impedance state at a cross point of two differential input signals. Here, the cross point is a point where two time variant differential input signals meet each other. As a result, the conventional squelch detection circuit employing the foregoing comparator cannot detect whether the transmitting data is a noise element or a signal element at the cross point of the two differential input signals.

SUMMARY OF THE INVENTION

It is, therefore, an object of the present invention to provide a squelch detection circuit capable of effectively discriminating a data element (noise or signal) transmitted in a data transmission system operating in high speed.

In order to attain the above object, according to an aspect of the present invention, there is provided a squelch detection circuit including an input level shifter, a first reference voltage generator, an amplifier, a second reference voltage generator, and a comparator. The input level shifter amplifies potentials of received input signals and generates a signal having an average value of the amplified potentials. The first reference voltage generator provides a first reference voltage. The amplifier receives an output of the input level shifter and amplifies a voltage difference between the first reference voltage and a voltage of the output of the input level shifter to generate an amplified signal. The second reference voltage generator provides a second reference voltage using the first reference voltage. A comparator compares the voltage of the amplified signal and the second reference voltage and detects whether the received input signals contain a noise element of a signal element.

Further, the input level shifter having a source follower architecture serves to level up low differential input level to a voltage level that is compatible and easy to use, and includes P-channel metal oxide semiconductor (PMOS) transistors, and resistors. The input level shifter reacts even at a cross point of the differential input signals. The first reference voltage generator having a source follower architecture includes PMOS transistors whose gates are coupled to the ground voltage, and resistors. The amplifier for amplifying the differential voltage of the average voltage and the first reference voltage includes an inverted voltage amplifier. The second reference voltage generator utilizes the first reference voltage as an input voltage, and generates the second reference voltage by using variable resistors.

As is apparent from the foregoing, according to the squelch detection circuit of the invention, data elements (noise or signal) being transmitted in the data transmission system operating at high speed can be effectively detected, even at the cross point of two signals.

BRIEF DESCRIPTION OF THE DRAWINGS

The above and other objects, features and advantages of the present invention will become more apparent from the following detailed description when taken in conjunction with the accompanying drawings.

DESCRIPTION OF PREFERRED EMBODIMENTS

The following detailed description is of the best modes presently contemplated by the inventors for practicing the invention. It should be understood that the description of these preferred embodiments is merely illustrative and that they should not be taken in a limiting sense.

A squelch detection circuit of the present invention detects data elements (noise or signal) being transmitted through a cable bus and provides the result for receiver to transmitter. The squelch detection circuit of the invention detects whether the transmitting data is a noise element or a signal element even at a cross point.

Figure 1:
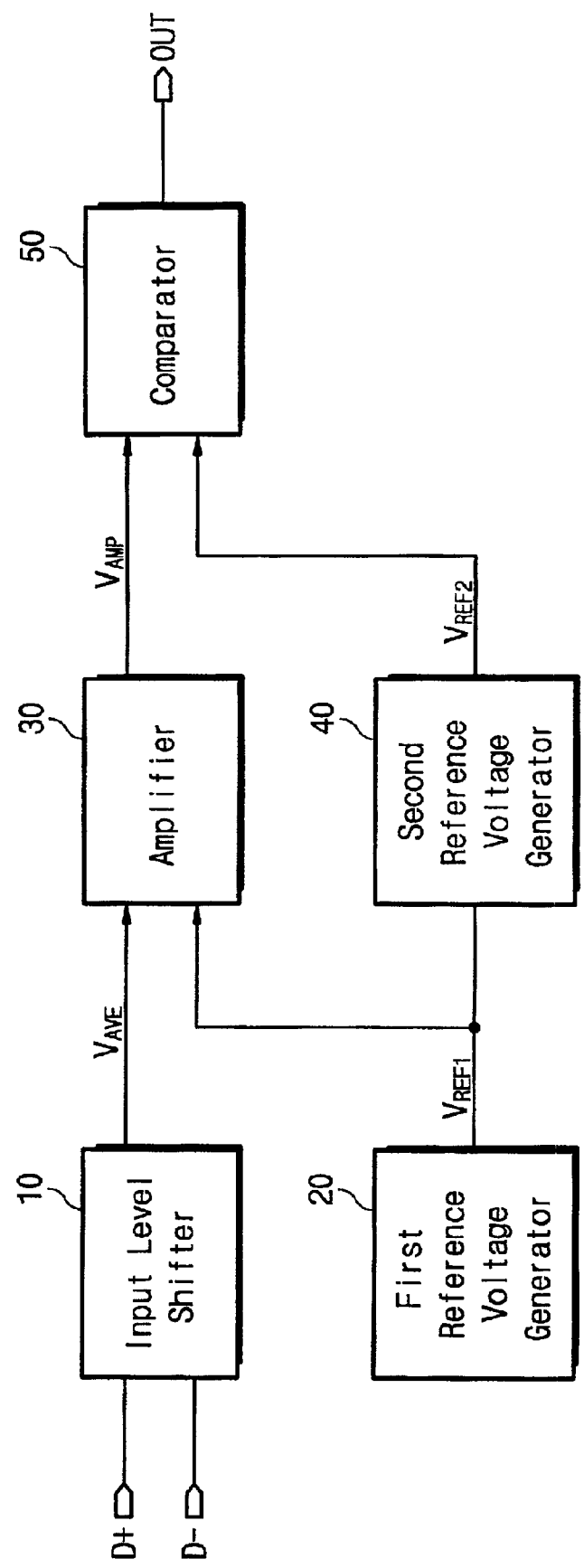
FIG. 1 is a block diagram of a squelch detection circuit according to an embodiment of the present invention.

FIG. 1 is a block diagram of the squelch detection circuit according to an embodiment of the present invention. Referring to FIG. 1, the squelch detection circuit includes an input level shifter 10 generating an average voltage $V_{AVE}$ in response to a data signal through two signal lines D+ and D−. A first reference voltage generator 20 generates a first reference voltage $V_{REF1}$ in response to power supply voltage and ground voltage. An amplifier 30 generates an amplifying voltage $V_{AMP}$ in response to the average voltage $V_{AVE}$ and the first reference voltage $V_{REF1}$. A second reference voltage generator 40 generates a second reference voltage $V_{REF2}$ in response to the first reference voltage $V_{REF1}$, and a comparator 50 detects a noise element or signal element of the transmitting data in response to the amplifying voltage $V_{AMP}$ and the second reference voltage $V_{REF2}$.

The input level shifter 10 shifts the potential levels of two differential input signals and generates the average voltage $V_{AVE}$. The first reference voltage generator 20 serves to provide a reference potential of the average voltage $V_{AVE}$. The amplifier 30 amplifies the differential potentials of the average voltage $V_{AVE}$ and the first reference voltage $V_{REF1}$ to a compatible voltage level. The second reference voltage generator 40 serves to provide a reference potential of the amplifying voltage $V_{AMP}$ provided from the amplifier 30. The comparator 50 compares the amplifying voltage $V_{AMP}$ with the second reference voltage $V_{REF2}$ and detects the transmitting data element.

Figure 2:
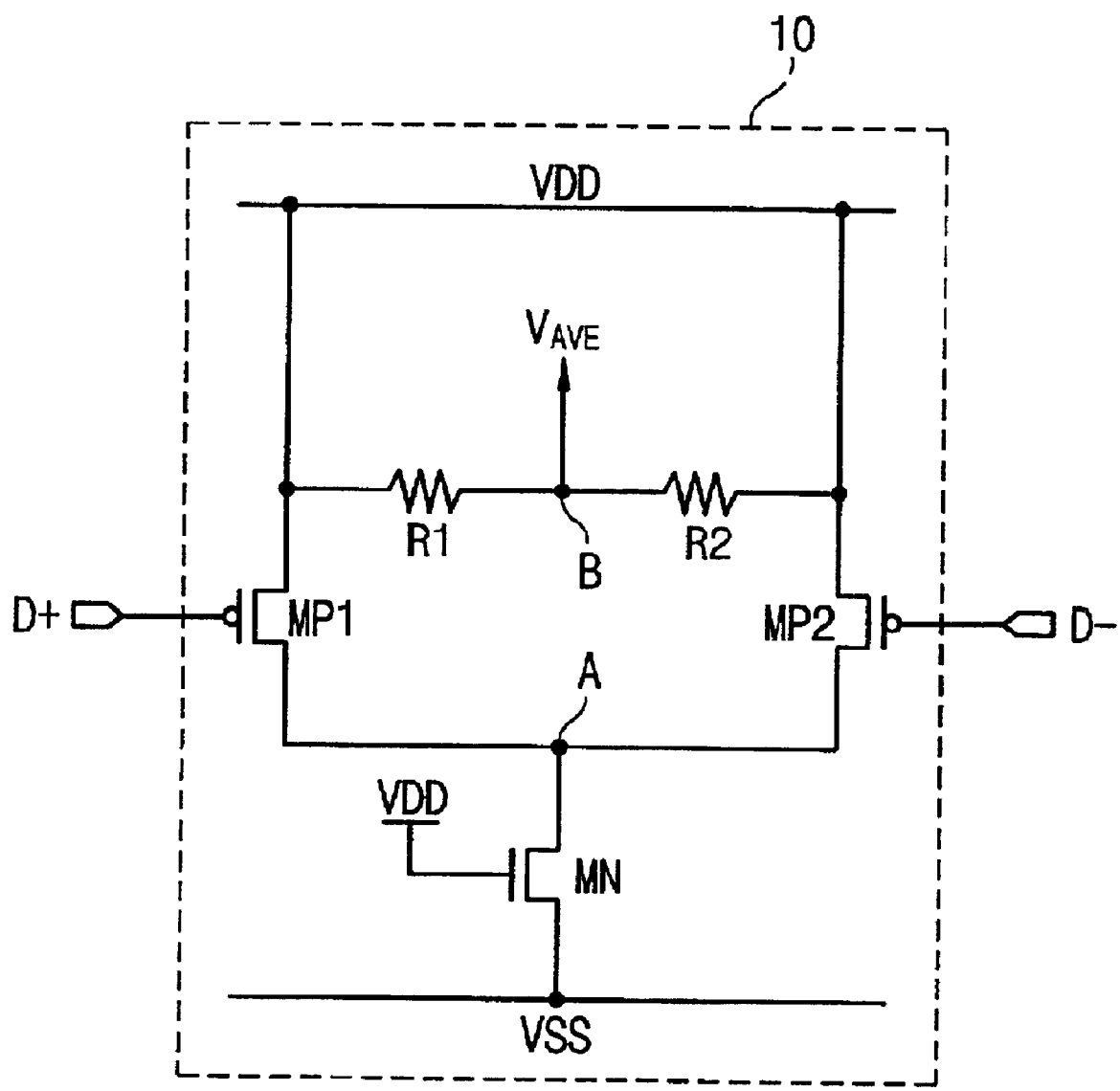
FIG. 2 is a circuit diagram of an input level shifter shown in FIG. 1.

FIG. 2 is a circuit diagram of the input level shifter 10 shown in FIG. 1. Referring to FIG. 2, the input level shifter 10 includes P-channel metal oxide semiconductor (PMOS) transistors MP1 and MP2, N-channel MOS transistor MN, resistors R1 and R2 serially connected between source terminals of the PMOS transistors MP1 and MP2, and an output terminal B. The PMOS transistors MP1 and MP2 whose gates are respectively coupled to the data signals D+ and D− are connected in parallel between the power supply voltage VDD and a node A. The NMOS transistor MN whose gate is coupled to the power supply voltage VDD is connected between the node A and the ground voltage VSS. The average voltage $V_{AVE}$ is generated at the output terminal B, which is serially connected between the resistors R1 and R2.

The PMOS transistors MP1 and MP2 have the same channel size, and the resistors R1 and R2 have the same resistance value. The input level shifter 10 generates level-shifted potentials for each of the source terminals of the PMOS transistors MP1 and MP2, averages the potentials of the source terminals, and generates the average voltage $V_{AVE}$.

Figure 3:
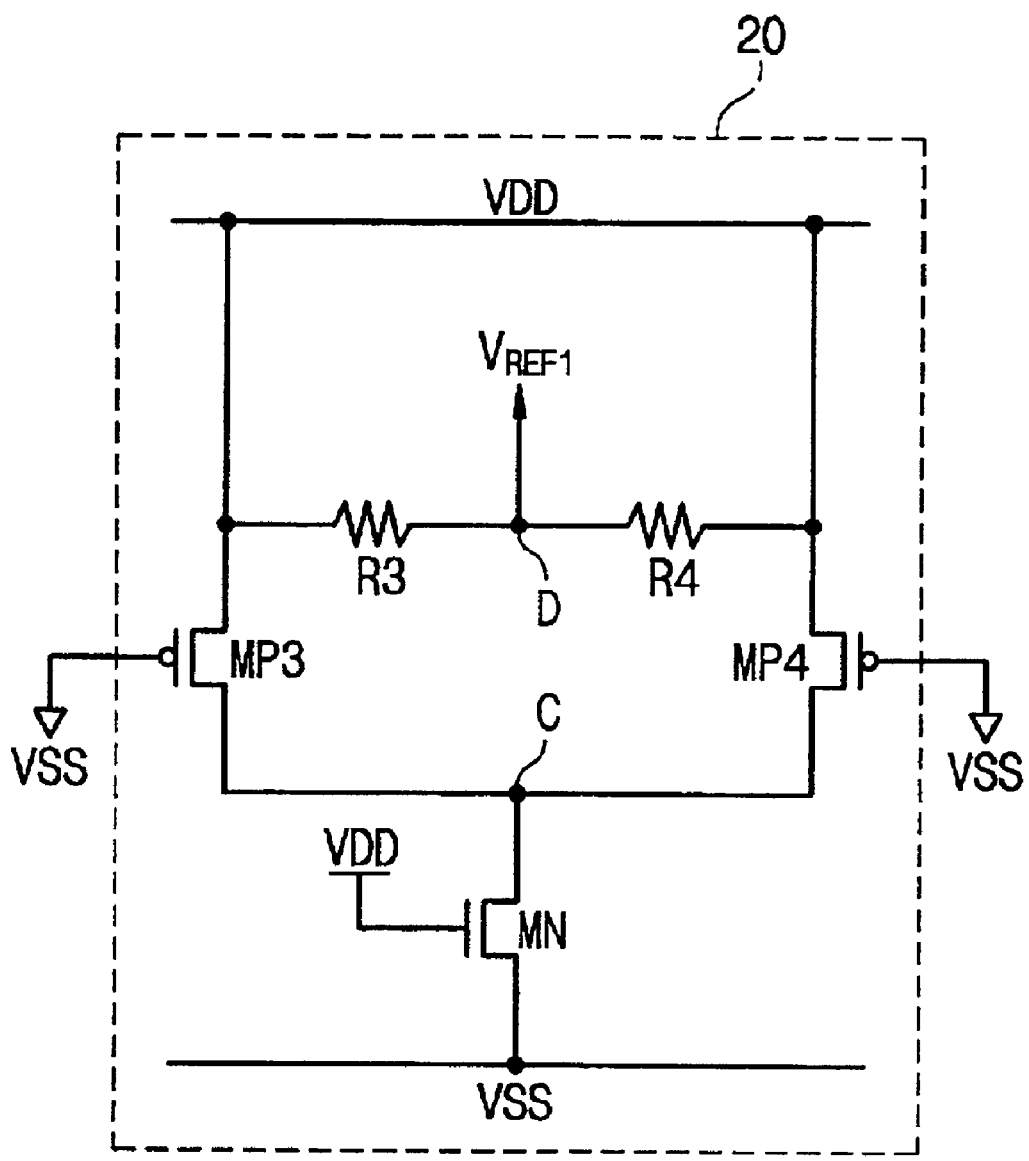
FIG. 3 is a circuit diagram of a first reference voltage generator shown in FIG. 1.

FIG. 3 is a circuit diagram of the first reference voltage generator 20 shown in FIG. 1. Referring to FIG. 3, the first reference voltage generator 20 includes PMOS transistors MP3 and MP4, NMOS transistor MN, resistors R3 and R4, and output terminal D. The PMOS transistors MP3 and MP4 whose gates are coupled to ground voltage VSS are connected in parallel between the power supply voltage VDD and a node C. The NMOS transistor MN whose gate is coupled to the power supply voltage VDD is connected between the node C and the ground voltage VSS. Resistors R3 and R4 are connected between source terminals of the PMOS transistors MP3 and MP4 in series. The first reference voltage $V_{REF1}$ is provided at output terminal D connected between the resistors R3 and R4.

The PMOS transistors MP3 and MP4 have the same channel size, and the resistors R3 and R4 have the same resistance value. As described above, the first reference voltage generator 20 serves to provide the reference potential of the average voltage $V_{AVE}$ provided from the input level shifter 10.

Figure 4:
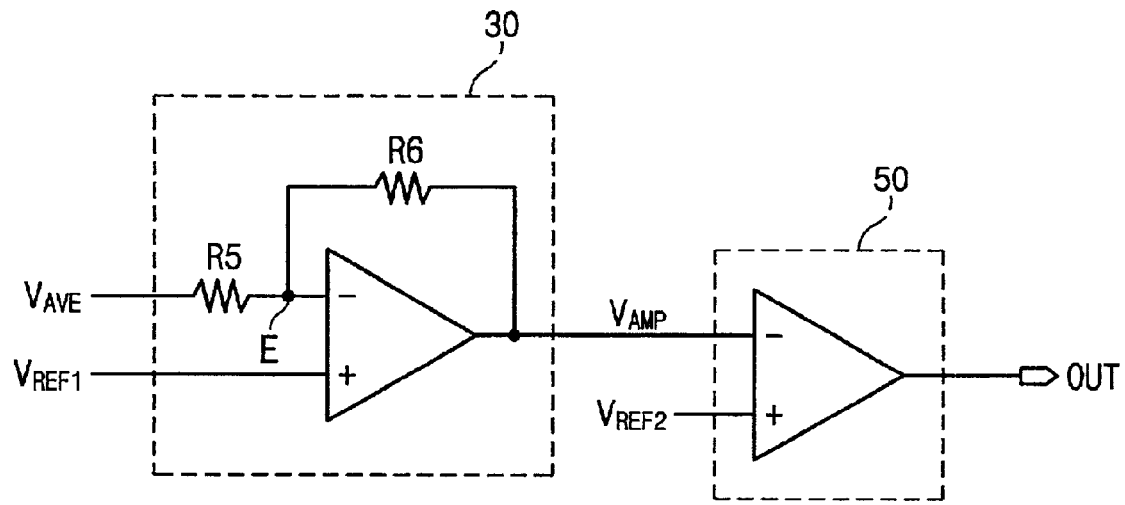
FIG. 4 is a circuit diagram of an amplifier and comparator shown in FIG. 1.

FIG. 4 is a circuit diagram of the amplifier 30 and the comparator 50 shown in FIG. 1. Referring to FIG. 4, the amplifier 30 is an inverted voltage amplifier, and includes resistor R5, inverted input amplifier, and feedback resistor R6. The resistor R5 is connected between the output terminal B of the input level shifter 10 and a node E. The inverted input amplifier has two input terminals connected between the node E and the output terminal D of the first reference voltage generator 20, and an output terminal connected to one terminal of the comparator 50. The amplifier 30 serves to amplify two input differential potentials to a compatible voltage level to use.

Referring to FIG. 4, the comparator 50 includes an operational amplifier. The comparator 50 serves to detect noise or signal elements from the data being transmitted through the cable bus.

Figure 5:
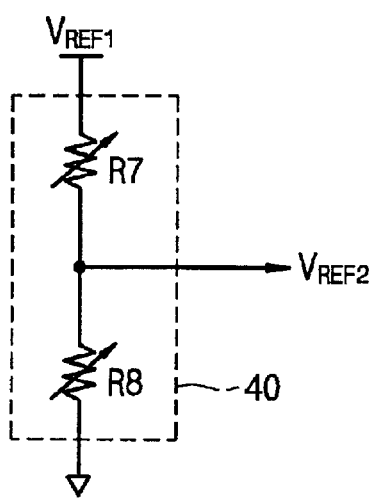
FIG. 5 is a circuit diagram of a second reference voltage generator shown in FIG. 1.

FIG. 5 is a circuit diagram of the second reference voltage generator 40 shown in FIG. 1. Referring to FIG. 5, the second reference voltage generator 40 includes variable resistors R7 and R8 serially connected between the input terminal of the first reference voltage $V_{REF1}$ and the ground voltage terminal. The resistance values of the variable resistors R7 and R8 are appropriately adjusted to be the reference level of the amplifying voltage $V_{AMP}$ provided from the amplifier 30.

Next, an operation for the squelch detection circuit having the foregoing architecture will be described. The squelch detection circuit of the present invention detects whether the data transmitted between the functions connected to the cable bus is a noise or signal element, and transmits the result to a receiver or a transmitter.

Referring again to FIG. 1, the squelch detection circuit provides a high level when the transmitting data is a noise element, and transmits the result to the receiver unit, in case that a voltage level of the differential input signal is less than 100 mV (average value is 50 mV). Further, the squelch detection circuit provides a low level when the data is a signal element, in case that the differential input signal voltage level is more than 150 mV (average value is 75 mV), i.e., the link is not in a squelch state.

Referring again to FIG. 1, the input level shifter 10 that levels up the transmitting data signals D+ and D− to a compatible easy voltage level has two functions. First, with reference to FIG. 2, it is assumed that the voltage levels of the data which is applied to the gates of the PMOS transistors MP1 and MP2 are respectively D+ and D−, and the level shift potentials of the PMOS transistors MP1 and MP2 are V1. Then, potentials on the source ends of the PMOS transistors MP1 and MP2 are respectively V1+(D+) adding the data voltage level D+ to the level shift value V1 and V1+(D−) adding the data voltage level D− to the level shift value V1. Thus, the average voltage $V_{AVE}$ that is output voltage of the input level shifter 10 is {(V1+(D+))+(V1+(D−))}/2, due to the voltage distribution rule. Here, the data signals D+ and D− have the same absolute value, and inverted phase with respect to each other. For instance, if the value of D− is a negative (−) voltage, the average voltage $V_{AVE}$ is V1+(D+)/2.

The other function is that the input level shifter 10 operates even at the cross point of the time variant data signals D+ and D−. If potential levels of data values being applied to the gates of the PMOS transistors MP1 and MP2 at the cross point are P, the average voltage $V_{AVE}$ that is the output voltage of the input level shift 10 is V1+P due to the foregoing average voltage formula. In other words, it is possible to detect the data element even at the cross point of the transmitting data.

The first reference voltage generator 20 serves to generate the first reference voltage $V_{REF1}$ of a predetermined potential from the time invariant ground voltage VSS. Referring next to FIG. 2, in the first reference voltage generator 20, if the level shift potentials of the PMOS transistors MP3 and MP4 are V1, the potentials of the source ends of the PMOS transistors MP3 and MP4 are level-shifted potential V1. Because the resistance values of the resistors R3 and R4 are the same as described above, the first reference voltage $V_{REF1}$ that is output voltage of the reference level shifter is V1. Referring to FIGS. 1 and 2, the average voltage $V_{AVE}$ which is ultimately provided from the input level shifter 10 has a potential difference as much as the data potential, compared with the first reference voltage which is ultimately provided from the first reference voltage generator 20. Thus, it is possible to amplify the low-level differential voltage of two data values D+ and D− being transmitted on the cable bus in view of a predetermined reference voltage. The amplifier 30 amplifies the potential difference of two signals to a usable voltage level. Further, the input level shifter 10 achieves the same operation even at the cross point of the transmitting data signals.

Referring to FIG. 4, the amplifier 30 is the inverted voltage amplifier that serves to amplify the potential difference of two input potentials to a predetermined level. An output voltage of an inverted voltage amplifier is obtained through a closed loop in view of a power supply voltage, which is established with twice the resistance ratio of the input voltage. The output voltage of the amplifier 30 in the present invention is summarized in:

$$V_{AMP} = -V_{AVE} \times (R6/R5).$$

As a result, the amplifying voltage $V_{AMP}$ is that the differential potential of transmitting data is ultimately amplified to a usable level.

Referring to FIG. 4, the comparator 50 compares the amplified voltage with the second reference voltage $V_{REF2}$ provided from the second reference voltage generator 40, detects whether the transmitting data is a noise or a signal element, and provides the result to a corresponding function.

Referring to FIG. 5, the second reference voltage generator 40 obtains the second reference voltage $V_{REF2}$ by using the first reference voltage $V_{REF1}$. It results in generating relatively stable reference voltage due to a voltage in the circuit itself instead of an absolute reference voltage.

The variable resistors R7 and R8 are approximately adjusted in accordance with the potential level of the amplifying voltage $V_{AMP}$.

An overall operation of the squelch detection circuit in the present invention will be described with specific exemplary numerical values hereinafter. Assuming that the average values of the differential potentials {V(D+)−V(D−)} are respectively 50 mV and 75 mV, the values are provided to the amplifier 30. Due to the input signals of 50 mV or 75 mV, it is difficult to treat the differential average size. Thus, the level shifter levels up the levels.

The amplifier 30 amplifies the signal levels more than 10 times, so that each of the input signal levels is made to 500 mV and 750 mV. The second reference voltage generator 40 generates the reference voltage about 650 mV by appropriately adjusting the resistors R7 and R8. Consequently, the comparator 50 detects whether the transmitting data is a noise or signal element, and transmits the result to a corresponding function.

According to the USB Specification Revision 2.0, in case that the amplifying voltage is 500 mV, the differential signal of transmitting data is less than 100 mV, and thus the squelch detection circuit detects the link is in the squelch state. Likewise, in case the amplifying voltage is more than 750 mV, the differential signal of transmitting data is more than 150 mV, and thus the squelch detection circuit detects the link is not in the squelch state.

When the squelch detection circuit is applied to the data transmission system, elements of the data signal can be effectively detected, resulting in achieving a stable operation in the entire system.

While the invention has been shown and described with reference to preferred embodiments thereof, it will be understood by those skilled in the art that various changes in form and details may be made therein without departing from the spirit and scope of the invention as defined by the appended claims. For example, the invention has been described in terms of the USB Specification Revision 2.0. It will be understood that other configurations are within the scope of the invention.

What is claimed is:

1. A squelch detection circuit in a serial data transmission system of high speed, the circuit comprising:

an input level shifter for amplifying potentials of received input signals, and generating a signal having an average value of the amplified potentials;

a first reference voltage generator for providing a first reference voltage;

an amplifier for receiving an output of the input level shifter, and amplifying a voltage difference between the first reference voltage and a voltage of the output of the input level shifter to generate an amplified signal;

a second reference voltage generator for providing a second reference voltage using the first reference voltage; and a comparator for comparing the voltage of the amplified signal and the second reference voltage, and detecting whether the received input signals contain a noise element or a signal element.

2. The squelch detection circuit of claim 1, wherein the input level shifter levels up low differential input level to a voltage level compatible with other elements of the squelch detection circuit.

3. The squelch detection circuit of claim 1, wherein the input level shifter generates a value adding a level-shifted value to the average value of the differential input signal.

4. The squelch detection circuit of claim 1, wherein the input level shifter functions at a cross point of the differential input signal.

5. The squelch detection circuit of claim 1, wherein the input level shifter has a source follower architecture, and comprises P-channel metal oxide semiconductor (PMOS) transistors, N-channel MOS transistor, and resistors.

6. The squelch detection circuit of claim 1, wherein the first reference voltage generator has a source follower architecture, and comprises PMOS transistors whose gates are coupled to ground voltage, NMOS transistor and resistors.

7. The squelch detection circuit of claim 1, wherein the amplifier amplifies a differential voltage of the signal having an average value of the amplified potentials and the first reference voltage to a predetermined voltage level, and comprises an inverted voltage amplifier.

8. The squelch detection circuit of claim 1, wherein the second reference voltage generator receives the first reference voltage, and generates the second reference voltage.

* * * * *